United States Patent
Viano et al.

(10) Patent No.: US 6,722,698 B2
(45) Date of Patent: Apr. 20, 2004

(54) SEAT BELT RETRACTOR SYSTEM

(75) Inventors: David Charles Viano, Bloomfield Hills, MI (US); Joseph D. McCleary, Clinton Township, Macomb County, MI (US); Edward Aloysius Jedrzejczak, Brown City, MI (US); William E. Thomas, West Bloomfield, MI (US); Richard A. McCormick, Sterling Heights, MI (US); Mark J. Sawade, Linden, MI (US)

(73) Assignee: General Motors Corporation, Detroit, MI (US)

( * ) Notice: Subject to any disclaimer, the term of this patent is extended or adjusted under 35 U.S.C. 154(b) by 27 days.

(21) Appl. No.: 10/104,157

(22) Filed: Mar. 22, 2002

(65) Prior Publication Data

US 2003/0178836 A1 Sep. 25, 2003

(51) Int. Cl.[7] ................................. B60R 22/34
(52) U.S. Cl. .................... 280/806; 180/268; 280/807
(58) Field of Search ................. 280/806, 807; 180/268, 282; 242/374, 390.8, 390.9

(56) References Cited

U.S. PATENT DOCUMENTS

| 4,264,089 | A | * | 4/1981 | Maekawa et al. ........... 280/803 |
|---|---|---|---|---|
| 4,410,202 | A | * | 10/1983 | Takada ........................ 280/804 |
| 5,289,987 | A | * | 3/1994 | Collins et al. ............ 242/385.3 |
| 5,443,222 | A | * | 8/1995 | Modinger et al. ........... 242/374 |
| 5,552,986 | A | | 9/1996 | Omura et al. .......... 364/424.05 |
| 5,558,370 | A | | 9/1996 | Behr .......................... 280/806 |
| 5,788,281 | A | | 8/1998 | Yanagi et al. ............... 280/806 |
| 5,853,135 | A | | 12/1998 | Dybro et al. ............... 242/374 |
| 6,280,331 | B1 | * | 8/2001 | Tuttlebee ..................... 464/46 |
| 6,371,397 | B1 | * | 4/2002 | Specht ..................... 242/375.1 |
| 6,494,395 | B1 | * | 12/2002 | Fujii et al. .................. 242/374 |
| 2001/0045483 | A1 | * | 11/2001 | Tanaka et al. ........... 242/390.9 |
| 2003/0052209 | A1 | * | 3/2003 | Honl et al. ................. 242/374 |

FOREIGN PATENT DOCUMENTS

| DE | 20115316 U1 | * | 2/2002 | ........... B60R/22/34 |
| EP | 0800970 A1 | | 10/1997 | |

* cited by examiner

Primary Examiner—Paul N. Dickson
Assistant Examiner—Laura B. Rosenberg
(74) Attorney, Agent, or Firm—Kathryn A. Marra

(57) ABSTRACT

A new and improved seat belt retractor system having an electronic control unit which is adapted to receive a signal from a sensor responsive to the buckling of the seat belt and causes an electric motor acting through a chain drive to drivingly rotate a reel in one direction for providing a predetermined seat belt loading on the seat occupant and that is responsive to the braking of the vehicle under emergency conditions to increase the tensioning of the seat belt to a level that exceeds the predetermined seat belt loading.

12 Claims, 3 Drawing Sheets

SEAT BELT RETRACTOR SYSTEM

TECHNICAL FIELD

This invention relates generally to seat belts for seat occupants and more particularly concerns a seat belt retractor system designed for use in automobiles or other conveyances and one that utilizes a simplified motorized drive arrangement for the purpose of removing slack in the seat belt and providing tensioning of the seat belt in an emergency situation.

BACKGROUND OF THE INVENTION

There have been various disclosures of seat belt retractors that incorporate motors which serve to remove slack in the seat belt as well provide tensioning of the seat belt under an emergency situation. One example of such seat belt retractor can be seen in European Patent Application EP 0800970A1 to Takata Corporation. This patent discloses a seat belt retractor that has an ultrasonic motor integrated with a belt reel of the retractor. There is no gear or clutch between the motor and reel and, instead, the shaft of the reel is directly connected to a plurality of piezoelectric devices which flex in a wave-like manner under the influence of ultrasonic signals for drivingly rotating the reel in one direction or the other. Other forms of retractors which have been proposed by others have the shaft of an electric motor connected to the reel through a planetary gear arrangement or through a worm gear arrangement.

The problem with a direct drive ultrasonic motor for use with a seat belt retractor is that the overall mechanism becomes an expensive piece of hardware which lacks reliability and makes serviceability more difficult. As to the motorized drives that are connected to the reel through a planetary gear arrangement, it has been found that such an arrangement may need a clutch, tends to have weak reeling power, and is quite noisy when operating. The worm gear arrangement similarly may require a clutch to operate properly and has also been found to suffer from the same noise problem encountered with the planetary gear arrangements.

Accordingly, there has been a need to provide a seat belt retractor system for removing slack and providing tensioning of the seat belt in an emergency situation that is cheaper in construction, quieter in operation, more reliable, and one that can be serviced easily.

SUMMARY OF THE INVENTION

To this end, one object of the present invention is to provide a new and improved seat belt retractor system that includes an electric motor connected through a simplified and reliable chain drive arrangement to the reel of the retractor mechanism so as to render the overall retractor mechanism quiet and less expensive to manufacture.

Another object of the present invention is to provide a new and improved seat belt retractor system that incorporates an electric motor which has its output shaft provided with a sprocket wheel that is connected through an endless chain to a sprocket wheel mounted to the input shaft of a reel supporting a seat belt.

A further object of the present invention is to provide a new and improved seat belt retractor system having an electric motor connected through a chain drive to the shaft of a reel and in which the only resistance to the initial withdrawal of the seat belt by the seat occupant is the inertia and friction of the electric motor, the chain drive, the reel, and the spooled belt.

A still further object of the present invention is to provide a new and improved seat belt retractor system incorporating an electronic control unit that serves to energize an electric motor which acts through a chain drive for automatically adjusting the tension of the seat belt to provide a predetermined seat belt loading of the seat belt onto the seat occupant.

A still further object of the present invention is to provide a new and improved seat belt retractor system having an electronic control unit which is adapted to receive a signal from a sensor responsive to the buckling of the seat belt and cause an electric motor acting through a chain drive to drivingly rotate a reel in one direction for providing a predetermined seat belt loading on the seat occupant.

A still further object of the present invention is to provide a new and improved seat belt retractor system for an automotive vehicle having an electronic control unit which is interfaced with a manual control for providing a desired tensioning of the seat belt and is also capable of receiving and continuously evaluating information about the braking of the vehicle so as to automatically increase the tension of the seat belt in emergency situations determined by the peak acceleration of the brake pedal exceeding nominally 10 g's by rapid application of the brake pedal in an emergency and, afterwards, the removal of the belt tension is realized by exceeding a time duration, removal of the foot from the brake pedal, or if there is a change in gear of the vehicle from forward to reverse.

The above and other objects are realized in accordance with the present invention by a seat belt retractor system which, in the preferred form, has a seat belt retractor mechanism incorporated within the center pillar of an automotive vehicle adjacent a seat assembly. The seat belt retractor system is adapted to provide a predetermined seat belt loading on a seat occupant under various operating conditions of the vehicle after the seat belt is buckled.

More specifically, the seat belt retractor system according to the present invention includes the above-mentioned seat belt retractor mechanism which has a seat belt wound about a reel that is supported within the aforementioned center pillar of the vehicle. The reel is fixed to an input shaft having a sprocket wheel mounted thereon that allows the reel to rotate, permitting the seat belt to be retracted or extended. The seat belt retractor mechanism also includes an electric motor supported within the pillar below the reel that has an output shaft rigidly connected to another sprocket wheel.

An endless chain is entrained about and interconnects the two sprocket wheels. The arrangement is such that when an occupant enters the vehicle, the seat belt can be pulled by the seat occupant without having to overcome the continuous force of a spring typically found in conventional seat belt retractors. The only resistance to pulling the seat belt is created by the inertia and friction of the chain drive, electric motor, the reel, and the spooled seat belt. If the belt tension is released, the seat belt stays in position. This advantage is realized by having a control device which prevents energization of the electric motor when the seat belt is initially extended by the seat occupant. After the seat belt is buckled, a sensor responsive to the buckling of the seat belt and acting through the control device sends a signal to the electric motor to energize the electric motor and cause the input shaft to be drivingly rotated in a direction for providing a predetermined seat belt loading on the seat occupant.

In addition, an added feature of the seat belt retractor system according to the present invention is that the seat occupant can manually vary the tension of the seat belt so that differing comfort levels can be provided to the seat occupant. For example, a higher tension level can be selected for high-speed highway driving so that the seat occupant is held more securely in the seat. Another feature of the seat belt retractor system according to the present invention is the use of a sensor to measure brake pedal acceleration to indicate an emergency situation. In this regard, the control unit includes specific logic which has the seat belt loading on the seat occupant increase only when the velocity of the brake pedal exceeds a certain level and is maintained for a predetermined time period.

BRIEF DESCRIPTION OF THE DRAWINGS

Other objects, features and advantages of the present invention will become more apparent from the following detailed description of the invention when taken with the drawings in which.

DESCRIPTION OF THE PREFERRED EMBODIMENT

Figure 1:
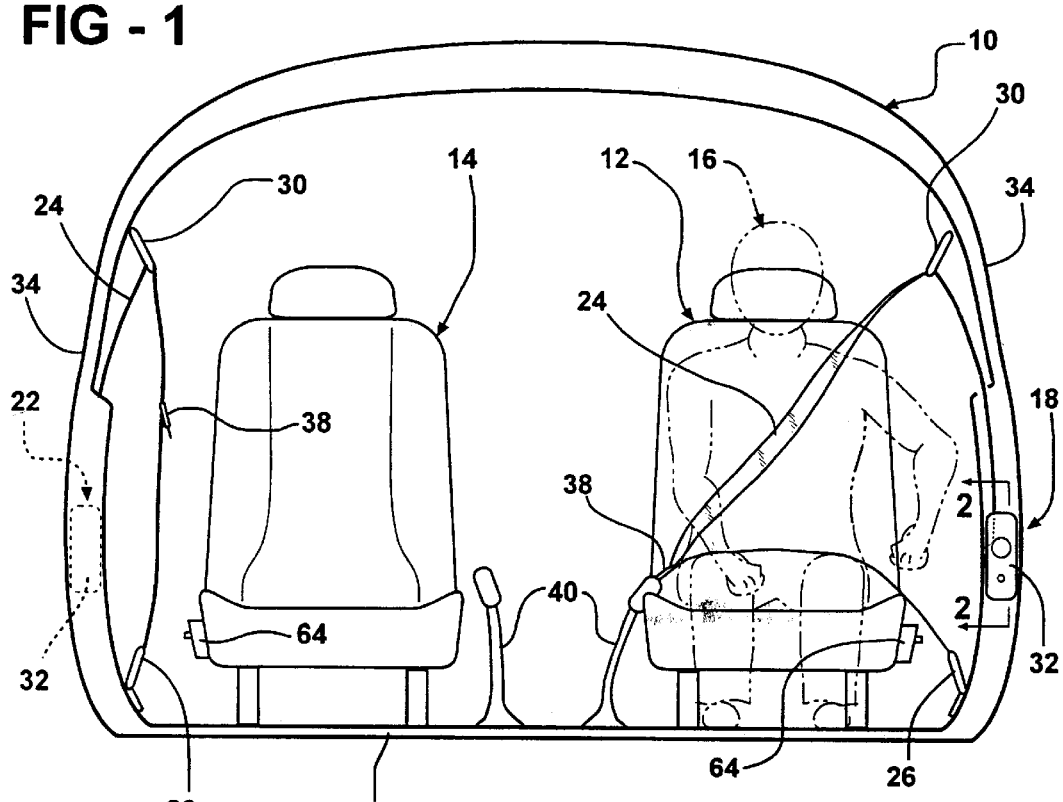
FIG. 1 is a cross-sectional view of an automotive vehicle showing a pair of front seat assemblies each of which has a seat belt retractor mechanism positioned alongside the seat assembly that forms a part of a seat belt retractor system made in accordance with the present invention.

Referring to the drawings and more particularly FIG. 1 thereof, a cross-sectional view of the interior of an automotive vehicle 10 is shown provided with a driver's seat assembly 12 alongside of a passenger's seat assembly 14. As shown, a driver or seat occupant 16 (shown in phantom lines) is seated and belted in the driver's seat assembly 12 utilizing a seat belt retractor mechanism 18 that forms a part of the seat belt retractor system 20 made in accordance with the present invention and seen in FIG. 4. In addition, an identical seat belt retractor mechanism 22 is located adjacent the passenger's seat assembly 14 that, in this instance, is shown in the fully retracted position.

Figure 2:
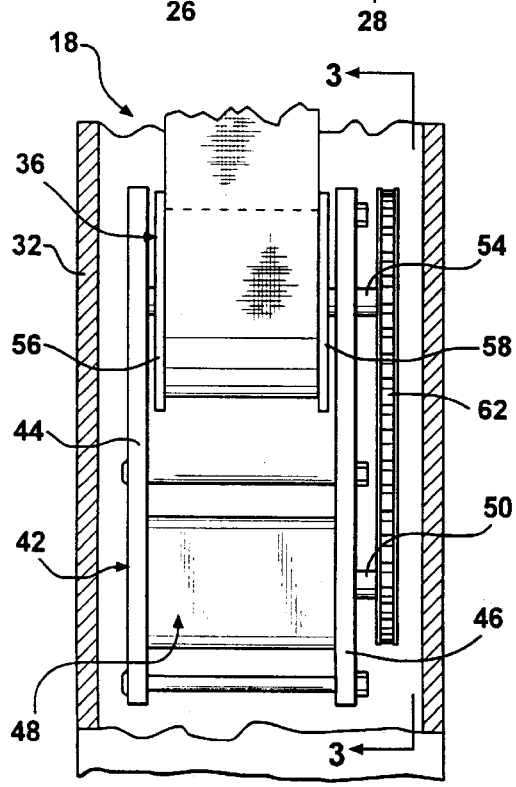
FIG. 2 is an enlarged view taken on line 2—2 of FIG. 1 showing one of the seat belt retractor mechanisms located adjacent the driver's seat assembly that includes an electric motor, a reel and a seat belt.
Figure 3:
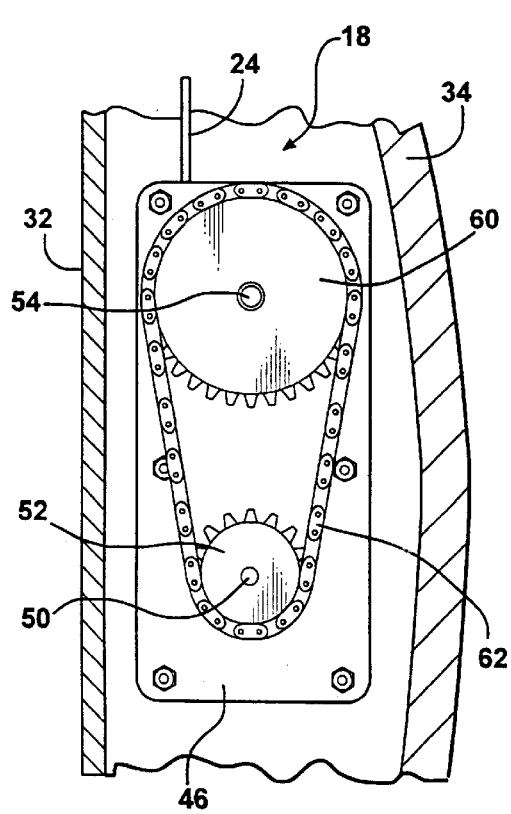
FIG. 3 is a view taken on line 3—3 of FIG. 2 showing more clearly the chain drive which forms a part of the seat belt retractor mechanism.

More specifically and as seen in FIGS. 2 and 3, each of the seat belt retractor mechanisms 18 and 22 includes a seat belt 24 with one end 26 thereof being secured by a bracket to the floor pan 28 of the vehicle 10. The other end of the seat belt 24 is looped through an adjustable shoulder anchor 30 and extends through a slot (not shown) formed within a housing 32 that is rigidly attached to the center pillar 34 of the vehicle 10. The other end of the seat belt 24 is fixed to and adapted to wind about a seat belt reel 36 located in the housing 32. A tongue member 38 is slidable along the seat belt and is receivable in a buckle 40 to secure a seat occupant in a normal occupant restraining position when the tongue member 38 is inserted into and locked within the buckle 40. A support member 42, consisting of a pair of bolted-together and spaced metal plates 44 and 46, is secured to the center pillar 34 of the vehicle 10 and serves to support the seat belt reel 36 and an electric motor 48 located below the seat belt reel 36. The electric motor 48 is provided with an output shaft 50 the outer end of which has a sprocket wheel 52 mounted thereon in fixed relationship therewith. The seat belt reel 36 includes a shaft that is carried for rotation by the plates 44 and 46 of the support member 42 and has one end that extends through plate 46 and serves as an input shaft 54. A pair of laterally-spaced disc-shaped members 56 and 58 is secured to the input shaft 54 and each disc member 56 and 58 has its periphery formed with ratchet teeth (not shown). In this regard, it will be understood that an inertia-activated pendulum-type latch (not shown) cooperates with the ratchet teeth of the disc members 56 and 58 so that, under rapid deceleration conditions of the vehicle 10, the latch engages the ratchet teeth to lock the seat belt reel 36 in position and thereby prevent rotation of the seat belt reel 36 in a direction that causes unwinding of the seat belt 24. Under such conditions and as is conventional, the ratchet teeth are one-way acting so as not to prevent the reel from rotating in the opposite direction to increase the tension of the seat belt 24 under certain conditions to be described hereinafter.

As best seen in FIG. 3 and as in the case of the output shaft 50 of the electric motor 48, the input shaft 54 of the seat belt reel 36 is also provided with a sprocket wheel 60 which is fixedly secured to the input shaft 54. An endless chain 62 is entrained about the sprocket wheels 52 and 60 and serves to transmit rotational drive from the electric motor 48 to the seat belt reel 36. The arrangement is such that when an occupant enters the vehicle, the seat belt 24 is in the fully retracted position and has a portion of the seat belt webbing located alongside of the seat back of a seat assembly. FIG. 1 shows the seat belt 24 located in this position alongside the passenger's seat assembly 14. Once the occupant is seated, the occupant grasps the tongue member 38 and pulls it across his/her chest and inserts it into the buckle 40. During this time, the only resistance to the pulling of the seat belt 24 by the seat occupant will be the inertia and friction of the electric motor 48, the chain drive (the chain movement and rotation of the sprocket wheels 52 and 60), the rotation of the seat belt reel 36, and the sliding of the tongue member 38 along the seat belt 24 and the sliding of the seat belt 24 through the shoulder anchor 30. Thus, the occupant will experience minimum resistance while pulling the seat belt 24. If the occupant should release the tongue member 38 prior to having it locked in the buckle 40, the seat belt 24 will stay in its extended position and not be retracted by the electric motor 48. This provides considerable convenience for the seat occupant to adjust the seat belt 24 and to easily have the tongue member 38 enter the buckle 40. This convenience is provided by the fact that the seat occupant need not have to overcome the continuous force that is typical of spring pullback that is found in conventional seat belt retractors.

Figure 4:
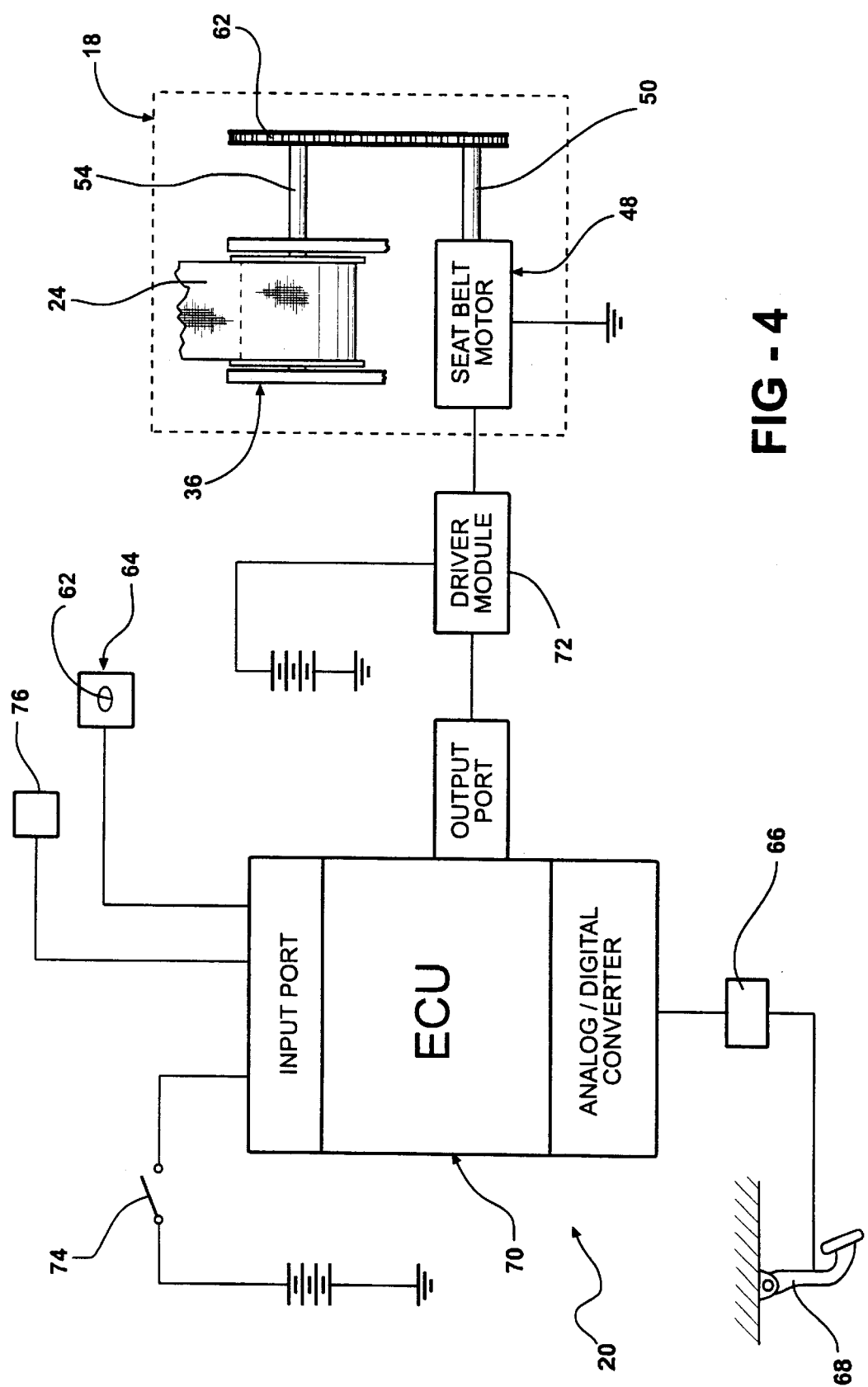
FIG. 4 is a schematic in a block diagram form showing the seat belt retractor mechanism of FIGS. 1–3 combined with a control device in accordance with the invention that provides manual adjustment of the tension of the seat belt and an automatic increase in the seat belt loading on a seat occupant under severe braking conditions of the vehicle.

After the tongue member 38 enters the buckle 40 and is locked therein, a sensor 76, seen in FIG. 4 and located within the buckle 40, causes the electric motor 48 to be energized. As a result, the electric motor 48 drives the sprocket wheels 52 and 60 through the chain 66 in a counterclockwise direction, as seen in FIG. 3, to wind the seat belt 24 upon the seat belt reel 36 and thereby provide a predetermined seat belt loading upon the seat occupant that is maintained by the electric motor 48. While the seat belt 24 is worn, the seat occupant is able to select the desired comfort level of the seat belt loading. The comfort level of such seat belt loading is realized by the stepped rotation of the knob of a potentiometer 64 located on one side of the seat cushion of the occupied seat assembly 12 or 14 so as to vary the tension of the seat belt 24 from 1–4 N. For high-speed highway driving, the seat occupant can increase the tension from 4–10 N by rotation of the knob of the potentiometer 64.

Each of the seat belt retractor mechanisms 18 and 22 described above is also intended to respond to the rate of brake pedal motion which is measured by a displacement sensor or transducer 66 attached to the brake pedal 68 as seen in FIG. 4. Thus, the rapid motion of the brake pedal 68 gives an early indication of emergency braking and, in accordance with the invention, causes the electric motor 48 to wind the seat belt 24 a predetermined amount to increase the tension of the seat belt 24 to 120 N. However, the increased loading occurs only if the braking of the vehicle 10 is maintained for a predetermined period of time.

The control and operation of the seat belt retractor mechanism 18 and 22 described above is realized by a seat belt retractor system 20 made in accordance with the present invention and seen in FIG. 4. In this instance, only the seat belt retractor mechanism 18 is shown being controlled by the seat belt retractor system 20, it being understood that the seat belt mechanism 22 is intended to be controlled so that it operates in the same manner.

As seen in FIG. 4, the seat belt retractor system 20 includes the seat belt retractor mechanism 18 combined with an electronic control unit (ECU) 70 which, in turn, is coupled to the electric motor 48 of the seat belt retractor mechanism 18 through a driver module 72.

Figure 5:
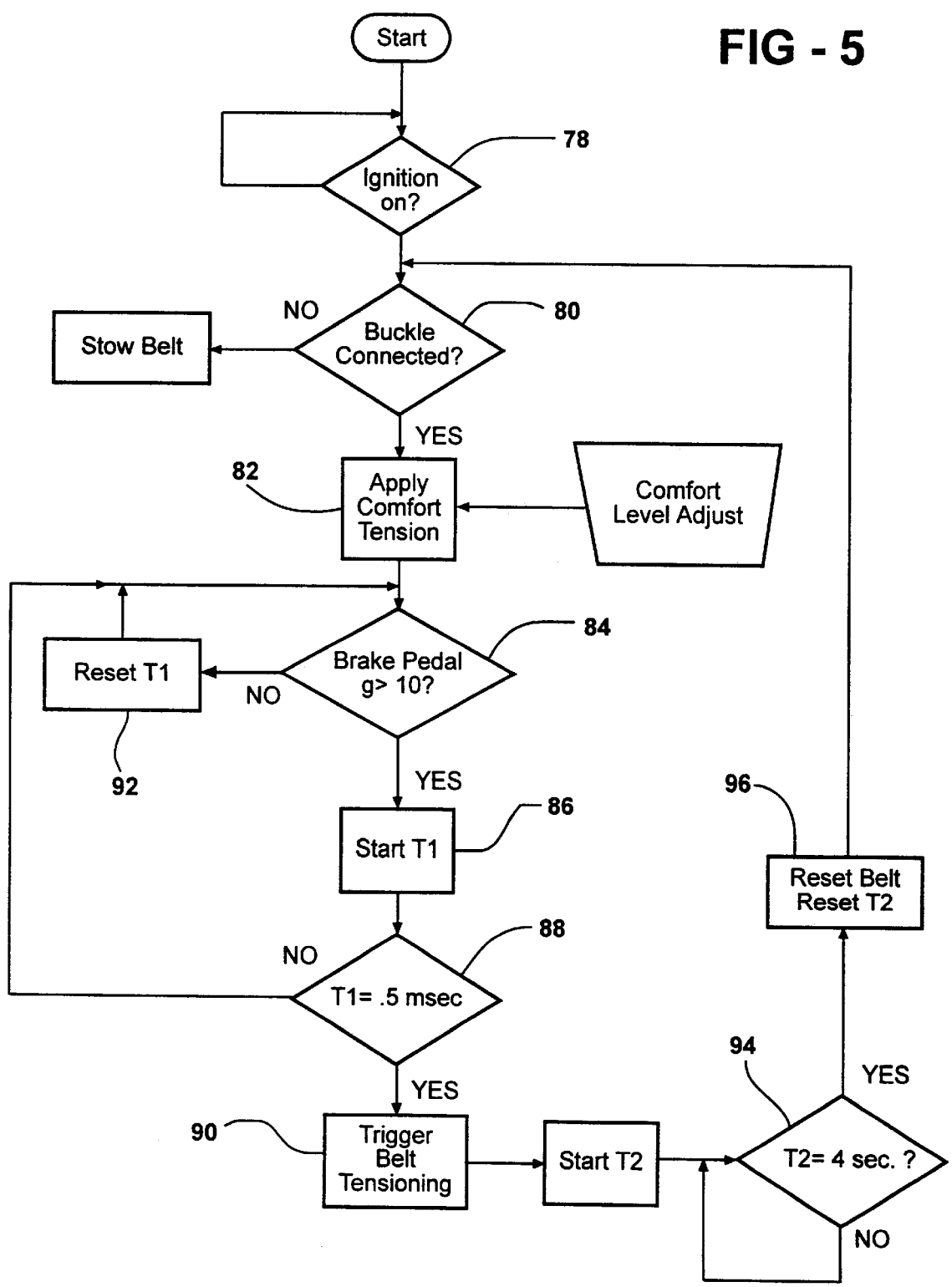
FIG. 5 is a flow diagram explaining the operation of the seat belt retractor system under the severe braking conditions of the vehicle.

The ECU 70 serves to execute a routine illustrated in FIG. 5 and generally takes the form of a digital computer-based controller. The controller includes a microprocessor that is standard in form and includes the standard elements such as a central processing unit which executes an operating program permanently stored in a read-only memory which also stores tables and constants, an analog-to-digital converter, a random access memory and input/output circuitry utilized to provide control signals to a driver interface circuit. The analog output from the sensor 66 as to the acceleration of the brake pedal 68 of the vehicle 10 is provided to the analog-to-digital converter which converts the signal to digital form. The output of a manual ignition switch 74 is provided to a discrete input port of the ECU 70 as well as other signals such as those obtained from the buckle sensor 76 and those obtained from the manually-operated potentiometer 64.

As seen in FIG. 4, the seat belt retractor system 20 is actuated when the ignition switch 74 of the vehicle 10 is in the closed position. When the ignition switch 74 is in the closed position, the ECU 70 is programmed so that the electric motor is de-energized. Thus, pulling of the tongue member 38 by the seat occupant causes an unwinding of the seat belt 24 from the seat belt reel 36. As aforementioned, the pulling force of the seat occupant is resisted only by the inertia and friction of the electric motor 48, the drive chain, rotation of the seat belt reel 36, and the sliding of the seat belt 24 through the shoulder anchor 30 and through the tongue member 38. Accordingly, if for some reason the seat occupant decides not to buckle the seat belt 24, the seat belt 24 will remain in its extended position. However, once the tongue member 38 enters the buckle 40 and is locked therein, the buckle sensor 76 sends a signal to the input port of the ECU 70 that the seat occupant is buckled in the seat assembly. The ECU 70 is then coupled to the driver module 72, which provides a pre-programmed drive signal to the electric motor 48. As a result, the electric motor 48 is energized and rotates a predetermined amount to apply a predetermined comfort level tension to the seat belt via the potentiometer 64. The predetermined tensioning of the seat belt 24 is maintained by having the electrical current to the electric motor 48 pulsed.

The potentiometer 64 interacts with the buckle sensor 76 to provide the comfort level of seat belt tensioning. The potentiometer 64 is used to adjust the low-end torque that provides seat belt comfort for the occupant. As previously indicated, such comfort level tension would be between 1 and 4 N. If desired, the seat occupant can increase the tension of the seatbelt 24 to a higher level (5–10 N) by rotating the knob of the potentiometer 64 to provide the desired seat belt loading onto his/her body. Assuming that the vehicle is experiencing normal travel and braking, the preset seat belt tension will be maintained on the seat occupant as explained above. In the event that an emergency situation should occur requiring panic braking and the brake pedal 68 is hit quickly by the occupant's foot so as to exceed an acceleration of at least 10 g's or more for 0.5 to 1.0 milliseconds, a panic signal will be sent to the analog/digital converter which is preprogrammed to cause the ECU 70 to be coupled to the driver module 72 to provide a drive signal to the electric motor 48 to rotate its output shaft 50 a certain amount to retract the seat belt 24 and increase the tension of the seat belt to 120 N to 250 N.

The flow diagram seen in FIG. 5 illustrates the operation of seat belt retractor system 20 and, with reference to such flow diagram, it will be noted that with the vehicle ignition on at step 78 and the tongue member 38 not connected to the buckle 40, the seat belt 24 is in the non-active stow position. If the tongue member 38 is inserted into the buckle 40 and the buckle 40 is locked or connected to the tongue member 38 at step 80, the ECU 70 sends a signal to the electric motor 48 to apply the comfort tension at step 82. Also, during this time, the seat occupant can adjust the level of the comfort tension through the potentiometer 64 as described above. So long as there is no panic-braking alert, the tension in the seat belt 24 will remain as pre-set or as adjusted by the potentiometer 64. If, however, the brake pedal 68 is hit and causes an acceleration of greater than 10 g's, a first timer (T1) at step 86 starts at zero, and if it reaches 0.5 milliseconds at step 88, the ECU 70 is pre-programmed so that it is coupled to driver module 72 which provides a signal to the electric motor 48 to increase the tension and the seat belt loading on the occupant to between 120 and 180 N. If the 10 g's acceleration of the brake pedal 68 is maintained for less than 0.5 milliseconds at step 88, the timer (T1) returns to zero at step 92. When the ECU 70 activates the electric motor 48 at step 90, a second timer (T2) starts counting at step 94 for up to four seconds for maintaining the increased tension of the seat belt 24. If the pressure on the brake pedal 68 is released, the second timer (T2) is reset and causes the ECU 70 to stop energization of the electric motor 48 and permits it to return via step 96 to where the comfort level of tension is applied to the seat belt 24. The belt tensioning can also be removed if there is a change in gear of the vehicle from forward to reverse.

Once the seat belt 24 is uncoupled from the buckle 40, the ECU 70 is programmed so that the driver module 72 provides a signal to the electric motor 48 to cause the seat belt 24 to be retracted onto the seat belt reel 36 and stored in the position, as shown in FIG. 1, alongside of the adjacent seat assembly. In such situation, a seat belt retraction force of 4 to 6 N can be used after unbuckling and during stowing of the seat belt 24. This gives a rapid action as the seat belt 24 quickly retracts to the stowed position. The greater retraction force prevents twisting of the seat belt 24 and removes the seat belt webbing from the seat occupant's body to facilitate egress from the vehicle 10. This also reduces the tendency for the seat belt 24 to be caught in or partially outside of the door when the door is closed. In addition, the ECU is programmed so that the removal of belt tension can be realized by exceeding a time duration The electric motor 48 that can be used in practicing the present invention is a 12 Volt DC motor, Model 2315/5Y made by Aveox, Inc. 31324 Via Colonas, Suite 103, Westlake Village, Calif. 91362. One seat belt retractor mechanism that was successfully used for practicing the present invention had the sprocket wheel 52 (which mounts on the output shaft of the electric motor 48) measuring 1.33 inches in diameter, containing 15 teeth and having a 1.2 inch pitch diameter. The sprocket wheel 60 mounted on the seat belt reel 36 measured 3.01 inches in diameter, contained 36 teeth, and had a 2.869 pitch diameter. The distance between the centers of the sprocket wheels 52 and 60 measured approximately four inches.

Although the seat belt retractor system 20 described above provides the benefits indicated in response to the acceleration of the brake pedal, other forms of inputs to the CPU 70 can result in the same slack take-up and tensioning of the seat belt 24. For example, in addition to having the system respond to brake pedal acceleration, it could also respond to the activation of the antilock braking system of the vehicle, air bag activation, and a predetermined speed of the vehicle. In general, it is the intent of the inventors to have the system respond to whatever vehicle signal that gives the earliest indication of an emergency or pre-crash situation to activate the tensioning of the seat belt as explained above.

Various changes and modifications can be made in the system disclosed herein without departing from the spirit of the invention. Such changes and modifications are contemplated by the inventors and they do not wish to be limited except by the scope of the appended claims.

What is claimed is:

1. A seat belt retractor system for providing a predetermined seat belt loading on a seat occupant after the seat belt is initially extended and locked in a buckle, said seat belt retractor system comprising a reel having said seat belt wound thereabout, said reel having an input shaft about which said reel rotates when said seat belt is retracted and when said seat belt is extended, an electric motor having an output shaft, said input shaft of said reel having a first sprocket wheel mounted thereon and said output shaft of said electric motor having a second sprocket wheel mounted thereon, an endless chain entrained about and interconnecting said first sprocket wheel with said second sprocket wheel, and a control device for providing a signal to said electric motor when said seat belt is locked in said buckle for energizing said electric motor and causing said input shaft to be drivingly rotated in one direction for providing said predetermined seat belt loading on said seat occupant.

2. The seat belt retractor system set forth in claim 1 wherein said control device includes a central processing unit generating a control signal to said electric motor.

3. The seat belt retractor system set forth in claim 2 wherein said central processing unit provides an initial value of seat belt retraction for providing said predetermined seat belt loading of said seat belt onto said seat occupant.

4. The seat belt retractor system set forth in claim 3 wherein said system includes a brake pedal, a sensor for measuring the acceleration of said brake pedal during the braking input provided by said seat occupant, said sensor being responsive to a predetermined acceleration of said brake pedal when said braking input is maintained for a predetermined time period so as to cause said central processing unit to send a signal to said electric motor to provide a seat belt loading onto said seat occupant greater than said initial value of seat belt loading.

5. The seat belt retractor system set forth in claim 3 wherein said central processing unit acts through a driver module to energize said electric motor and the only resistance to the unwinding of the reel during the initial extension of the seat belt by the seat occupant is the inertia and friction of the electric motor, the reel, the chain, and the seat belt.

6. A seat belt retractor system for providing a predetermined seat belt loading on a seat occupant after the seat belt is initially extended and buckled, said seat belt retractor system comprising a reel having said seat belt wound thereabout, said reel having an input shaft about which said reel rotates when said seat belt is retracted and when said seat belt is extended, an electric motor having an output shaft, said input shaft having a first sprocket wheel mounted thereon and said output shaft having a second sprocket wheel mounted thereon, an endless chain entrained about and interconnecting said first sprocket wheel with said second sprocket wheel, and a control device for energization of said electric motor, and a sensor responsive to the buckling of said seat belt and acting through said control device to provide a signal to said electric motor so as to energize said electric motor and cause said input shaft to be drivingly rotated for providing said predetermined seat belt loading on said seat occupant, the arrangement being such that during the initial extension of the seat belt by the seat occupant, the only resistance to the unwinding of the reel is the inertia and friction of the electric motor, the reel, the chain, and the seat belt.

7. In combination with an automotive vehicle provided with a pillar adjacent a seat assembly, a seat belt retractor system operatively associated with said seat assembly for providing a predetermined seat belt loading on a seat occupant after said seat belt is initially extended and buckled, said seat belt retractor system comprising a reel supported within said pillar and having said seat belt wound thereabout, said reel having an input shaft about which said reel rotates when said seat belt is retracted and when said seat belt is extended, an electric motor supported within said pillar below said reel and having an output shaft, said input shaft having a first sprocket wheel mounted thereon and said output shaft having a second sprocket wheel mounted thereon, an endless chain entrained about and interconnecting said first sprocket wheel with said second sprocket wheel, and a control device for energization of said electric motor, and a sensor responsive to the buckling of said seat belt and acting through said control device to send a signal to said electric motor to energize said electric motor and cause said input shaft to be drivingly rotated in one direction for providing said predetermined seat belt loading on said seat occupant, the arrangement being such that during the initial extension of the seat belt by the seat occupant, the only resistance to the unwinding of the reel is the inertia and friction of the electric motor, the reel, the chain, and the seat belt.

8. The combination set forth in claim 7 wherein said control device includes a central processing unit for receiving said signal from said sensor and, in response thereto, generates a control signal to said electric motor.

9. The combination set forth in claim 8 wherein said central processing unit provides an initial value of seat belt retraction for providing said predetermined seat belt loading of said seat belt onto said occupant.

10. The combination set forth in claim 8 wherein said automotive vehicle includes a brake pedal, a second sensor for measuring the acceleration of said brake pedal during the braking input provided by said occupant, said second sensor being responsive to a predetermined acceleration of said brake pedal with said braking input being maintained for a predetermined time period to cause said central processing unit to send a signal to said electric motor so as to provide a seat belt loading onto said occupant greater than said predetermined seat belt loading.

11. The combination set forth in claim 10 wherein said electric motor and said reel are mounted on a common support member one above the other so as to provide a compact unit easily accommodated by the center pillar of said automotive vehicle.

12. The combination set forth in claim 11 wherein said input sprocket wheel has a diameter greater than the diameter of said output sprocket wheel.

* * * * *